(12) United States Patent
Lee et al.

(10) Patent No.: US 11,649,565 B2
(45) Date of Patent: May 16, 2023

(54) FIBER FOR SOUND-ABSORBING MATERIAL FOR VEHICLES AND SOUND-ABSORBING MATERIAL FOR VEHICLES INCLUDING THE SAME

(71) Applicants: Hyundai Motor Company, Seoul (KR); Kia Motors Corporation, Seoul (KR); GH Advanced Materials Inc., Gyeongsangbuk-do (KR); NVH KOREA, INC., Ulsan (KR)

(72) Inventors: Jung Wook Lee, Gyeonggi-do (KR); Seong Je Kim, Jeollanam-do (KR); Ji Wan Kim, Gyeonggi-do (KR); Tae Yoon Kim, Daejeon (KR); Jong Hyun Ryu, Gyeonggi-do (KR); Myung Sik Lee, Gyeonggi-do (KR); Hee Koo Woo, Gyeonggi-do (KR)

(73) Assignees: Hyundai Motor Company, Seoul (KR); Kia Motors Corporation, Seoul (KR); GH Advanced Materials Inc., Gumi (KR); NVH Korea, INC., Ulsan (KR)

( * ) Notice: Subject to any disclaimer, the term of this patent is extended or adjusted under 35 U.S.C. 154(b) by 304 days.

(21) Appl. No.: 16/902,998

(22) Filed: Jun. 16, 2020

(65) Prior Publication Data
US 2021/0010164 A1    Jan. 14, 2021

(30) Foreign Application Priority Data
Jul. 10, 2019    (KR) .......................... 10-2019-0082986

(51) Int. Cl.
*D01F 6/06* (2006.01)
*D01F 6/62* (2006.01)
*B60R 13/08* (2006.01)

(52) U.S. Cl.
CPC .................. *D01F 6/06* (2013.01); *D01F 6/62* (2013.01); *B60R 13/0815* (2013.01)

(58) Field of Classification Search
CPC ......... D01F 6/06; D01F 6/62; B60R 13/0815; Y10T 442/3089; Y10T 442/3098;
(Continued)

(56) References Cited

U.S. PATENT DOCUMENTS

| 5,057,368 A | 10/1991 | Largman et al. |
| 2004/0170828 A1 | 9/2004 | Shoemaker |

(Continued)

FOREIGN PATENT DOCUMENTS

| CN | 102066626 A | 5/2011 |
| CN | 104918826 A | 9/2015 |

(Continued)

*Primary Examiner* — Jeremy R Pierce
(74) *Attorney, Agent, or Firm* — Fox Rothschild LLP

(57) ABSTRACT

Disclosed are a fiber for a sound-absorbing material for vehicles and a sound-absorbing material for vehicles including the same. The cross-section of the fiber for a sound-absorbing material includes a first end portion, a second end portion spaced apart from the first end portion, and an intermediate portion connected to the first end portion and the second end portion. The intermediate portion includes at least three bent portions. Each of the first end portion and the second end portion has a width larger than the width of the intermediate portion.

11 Claims, 14 Drawing Sheets

(58) Field of Classification Search
CPC ......... Y10T 442/3114; Y10T 442/3122; Y10T 442/609; Y10T 442/61; Y10T 442/611
See application file for complete search history.

(56) References Cited

U.S. PATENT DOCUMENTS

2005/0246842 A1* 11/2005 Jen .................... D03D 15/49
                                                                                                         8/139
2011/0008620 A1    1/2011 Wu

FOREIGN PATENT DOCUMENTS

| CN | 107313179 A | | 11/2017 | |
|----|-------------|---|---------|---|
| JP | H11222721 A | | 8/1999 | |
| JP | 200527311 A | | 1/2005 | |
| JP | 2005113325 A | * | 4/2005 | ............... D01D 5/00 |
| JP | 2005273115 A | | 10/2005 | |
| WO | WO-2009150745 A1 | * | 12/2009 | ............. A41D 31/12 |

* cited by examiner

FIBER FOR SOUND-ABSORBING MATERIAL FOR VEHICLES AND SOUND-ABSORBING MATERIAL FOR VEHICLES INCLUDING THE SAME

CROSS-REFERENCE TO RELATED APPLICATION

This application claims under 35 U.S.C. § 119(a) the benefit of priority to Korean Patent Application No. 10-2019-0082986 filed on Jul. 10, 2019, the entire contents of which are incorporated herein by reference.

TECHNICAL FIELD

The present invention relates to a fiber for a sound-absorbing material for vehicles and a sound-absorbing material for vehicles including the same.

BACKGROUND

Recently, vehicles have come to be recognized as private spaces, and thus the demand for good sound absorption capability has increased. A sound-absorbing material may be mounted, for example, on a panel of a vehicle in order to block the introduction of engine noise into the interior of the vehicle.

The sound absorption efficiency of a sound-absorbing material may be improved in proportion to the pore volume between fibers. However, as the pore volume is increased, the bonding force between the fibers may decrease, and the durability and shape retention of the sound-absorbing material may be deteriorated, resulting in low mass productivity.

The above information disclosed in this Background section is only for enhancement of understanding of the background of the invention and therefore it may contain information that does not form the prior art that is already known in this country to a person of ordinary skill in the art.

SUMMARY

In one preferred aspect, provided is a fiber for a sound-absorbing material for vehicles, which has improved durability and sound absorption performance.

Further, in one preferred aspect, provided is a sound-absorbing material for vehicles, which has improved durability and sound absorption performance.

In one aspect, provided is a fiber for a sound-absorbing material for vehicles. The fiber may include a predetermined cross-section, which includes a first end portion, a second end portion spaced apart from the first end portion, and an intermediate portion connected to the first end portion and the second end portion. The intermediate portion includes at least three bent portions. Each of the first end portion and the second end portion has a width larger than the width of the intermediate portion.

The cross-section of the fiber may have an M shape.

The intermediate portion may have an M shape.

The intermediate portion may include a first intermediate portion connected to the first end portion, a second intermediate portion connected to the first intermediate portion, a third intermediate portion connected to the second intermediate portion, and a fourth intermediate portion connected to the third intermediate portion and the second end portion. The first intermediate portion and the second intermediate portion may form a first bent portion, the second intermediate portion and the third intermediate portion may form a second bent portion, and the third intermediate portion and the fourth intermediate portion may form a third bent portion.

Preferably, the ratio of the width A1 of the first end portion to the width a of the intermediate portion (A1/a) may be about 1.1 to 3.0, and the ratio of the width A2 of the second end portion to the width a of the intermediate portion (A2/a) may be about 1.1 to 3.0. Preferably, the width of the cross-section of the intermediate portion may be about 3 to 15 μm.

Preferably, the ratio of length to width of the cross-section of the intermediate portion may be about 5 to 25.

In another aspect, provide is a sound-absorbing material for vehicles including a fiber for a sound-absorbing material for vehicles. The fiber may include a predetermined cross-section, which includes a first end portion, a second end portion spaced apart from the first end portion, and an intermediate portion connected to the first end portion and the second end portion. The intermediate portion includes at least three bent portions. Each of the first end portion and the second end portion has a width larger than the width of the intermediate portion.

The fiber may be a base fiber, and the sound-absorbing material may include an amount of about 60 to 80 parts by weight of the base fiber and an amount of about 20 to 40 parts by weight of a binder fiber based on the total weight of the sound-absorbing material.

The base fiber may suitably include at least one selected from the group consisting of poly(ethylene terephthalate) (PET), polypropylene (PP), and poly(butylene terephthalate) (PBT).

The melting point of the entirety or the surface of the binder fiber may be less than the melting point of the base fiber, and the binder fiber may include at least one of a polyester-based polymer or a polyolefin-based polymer.

The cross-section of the binder fiber may be the same as the cross-section of the fiber for a sound-absorbing material, or may have a circular or elliptical shape.

Further provided is a vehicle including the sound-absorbing material as described herein.

Other aspects of the invention are discussed infra.

BRIEF DESCRIPTION OF THE DRAWINGS

The above and other features of the present invention will now be described in detail with reference to certain exemplary embodiments thereof illustrated in the accompanying drawings which are given hereinbelow by way of illustration only, and thus are not limitative of the present invention, and wherein.

Figure 1:
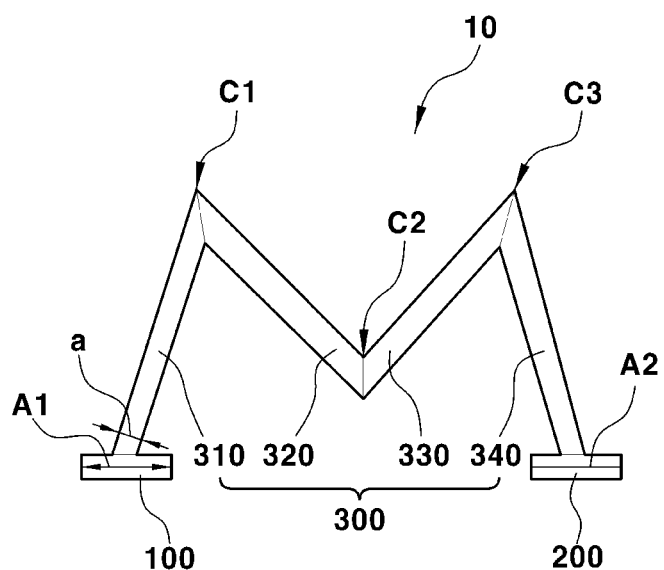
FIG. 1 shows a schematic cross-sectional view of an exemplary fiber for an exemplary sound-absorbing material for vehicles according to an embodiment of the present invention.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes, will be determined in part by the particular intended application and use environment.

In the figures, reference numbers refer to the same or equivalent parts of the present invention throughout the several figures of the drawing.

DETAILED DESCRIPTION

The above objects, other objects, features and advantages of the invention will be easily understood through preferred embodiments with reference to the accompanying drawings. The invention may, however, be embodied in many different forms, and should not be construed as being limited to the embodiments set forth herein. Rather, these embodiments are provided so that this disclosure will be thorough and complete, and will fully convey the concept of the invention to those skilled in the art.

In the drawings, the same or similar elements are denoted by the same reference numerals even though they are depicted in different drawings. In the drawings, the sizes of structures are exaggerated for clarity. It will be understood that, although the terms "first", "second", etc. may be used herein to describe various elements, these elements should not be limited by these terms. These terms are only used to distinguish one element from another. For example, a first element could be termed a second element, and, similarly, a second element could be termed a first element, without departing from the scope of the present invention. Singular forms are intended to include plural forms as well, unless the context clearly indicates otherwise.

It will be further understood that the terms "comprises", "includes", and/or "has", when used in this specification, specify the presence of stated features, integers, steps, operations, elements, components, or combinations thereof, but do not preclude the presence or addition of one or more other features, integers, steps, operations, elements, components, or combinations thereof. In addition, it will be understood that when an element such as a layer, film, region, or plate is referred to as being "on" another element, it can be directly on the other element or intervening elements may also be present. It will also be understood that when an element such as a layer, film, region, or plate is referred to as being "under" another element, it can be directly under the other element or intervening elements may also be present.

Unless otherwise indicated, all numbers, values, and/or expressions referring to quantities of ingredients, reaction conditions, polymer compositions, and formulations used herein are to be understood as modified in all instances by the term "about" as such numbers are inherently approximations that are reflective of, among other things, the various uncertainties of measurement encountered in obtaining such values.

Further, unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Further, where a numerical range is disclosed herein, such range is continuous, and includes unless otherwise indicated, every value from the minimum value to and including the maximum value of such range. Still further, where such a range refers to integers, unless otherwise indicated, every integer from the minimum value to and including the maximum value is included.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Hereinafter, a fiber for a sound-absorbing material for vehicles and a sound-absorbing material for vehicles including the same according to an exemplary embodiment of the present invention will be described.

The vehicle may be a means used to transport an object, a person or the like. The vehicle may be, for example, a land vehicle, a marine vessel or an aircraft. Examples of the land vehicle may include cars including passenger cars, vans, trucks, trailer trucks and sports cars, bicycles, motorcycles, trains, and the like. Examples of the marine vessel may include ships, submarines, and the like. Examples of the aircraft may include airplanes, hang gliders, hot air balloons, helicopters, small aircraft such as drones, and the like.

A sound-absorbing material may be mounted, for example, on a panel of a vehicle in order to block the introduction of engine noise into the interior of the vehicle. The sound-absorbing material may be, for example, a nonwoven fabric. A concrete description of the sound-absorbing material will be made later.

Figure 2:
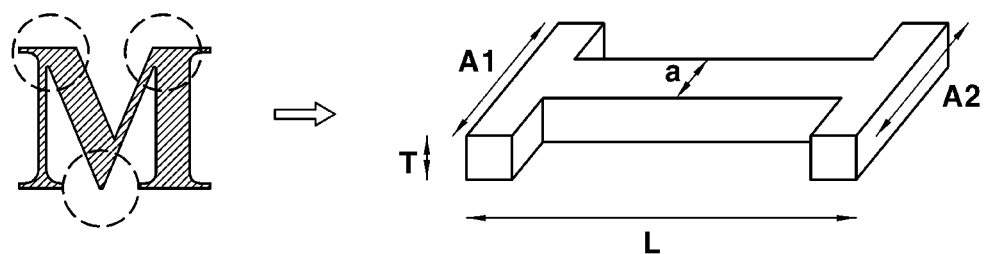
FIG. 2 shows a conceptual view for explaining the cross-section of an exemplary fiber for an exemplary sound-absorbing material for vehicles according to an exemplary embodiment of the present invention and the ratio of length to width of an intermediate portion thereof.
Figure 3A:
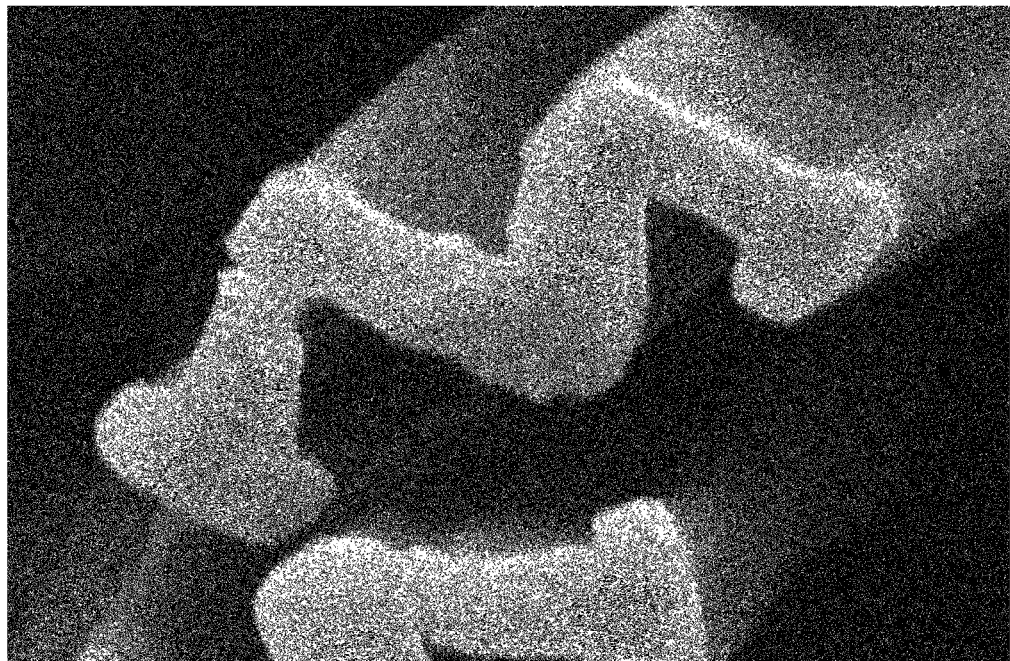
FIGS. 3A, 3B, 3C and 3D show pictures of a fiber for a sound-absorbing material of Example 1.
Figure 3B:
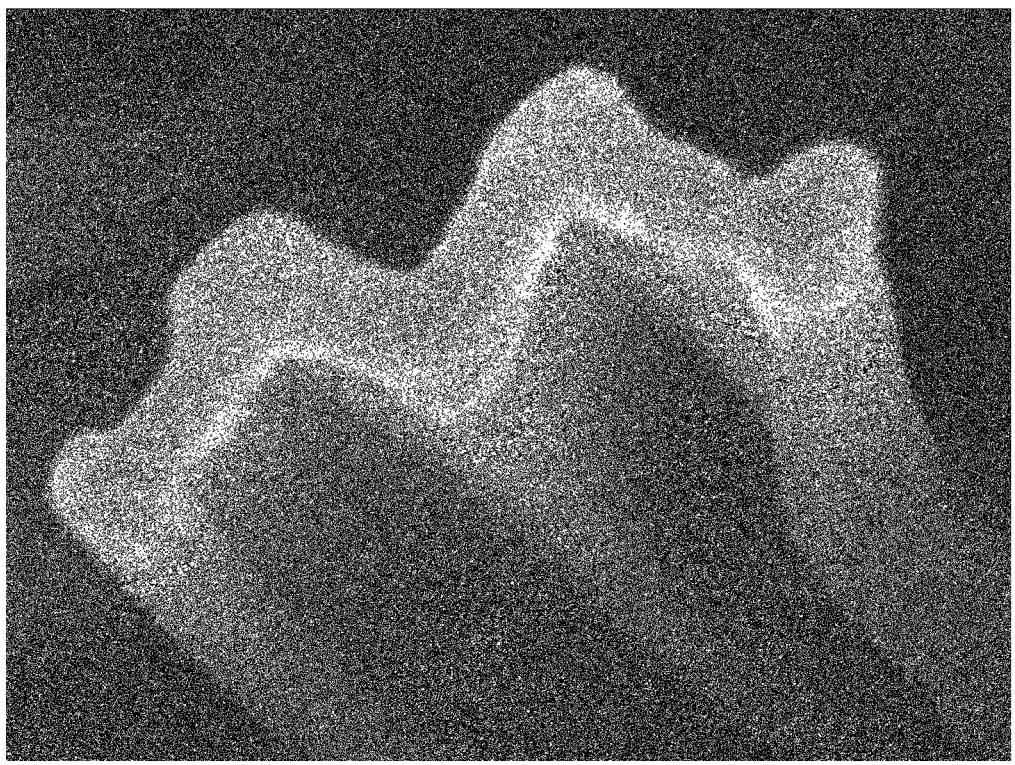
Figure 3C:
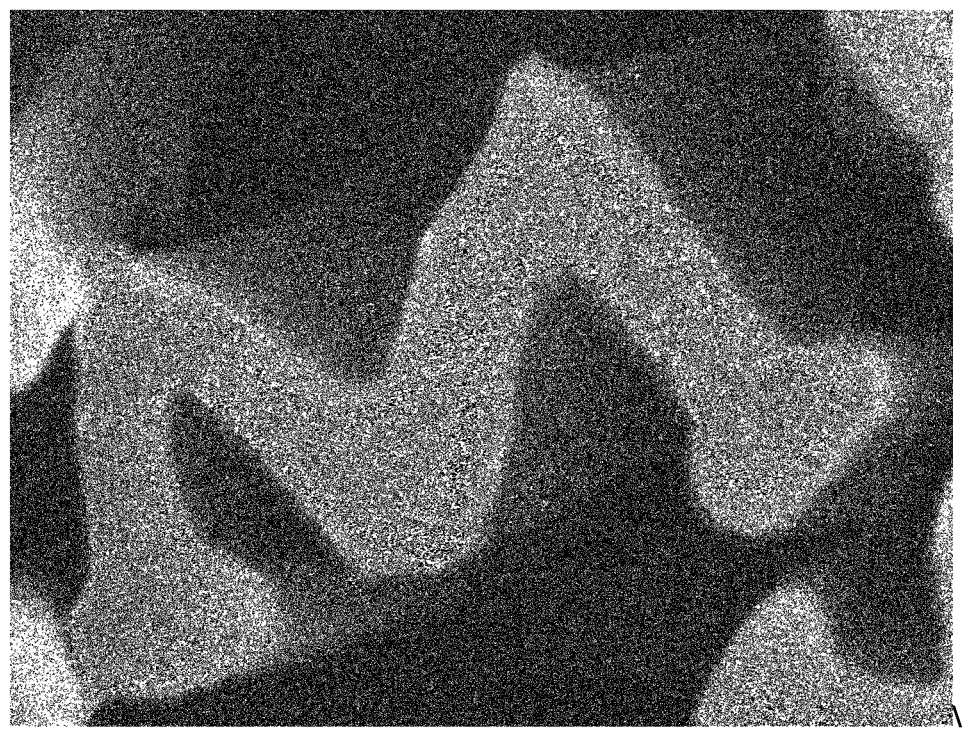
Figure 3D:

FIG. 1 shows a schematic cross-sectional view of an exemplary fiber for an exemplary sound-absorbing material for vehicles according to an exemplary embodiment of the present invention, and FIG. 2 shows a conceptual view for explaining the cross-section of the fiber for an exemplary sound-absorbing material for vehicles according to an exemplary embodiment of the present invention and the ratio of length to width of an intermediate portion thereof.

As shown in FIGS. 1 and 2, an exemplary fiber 10 for an exemplary sound-absorbing material for vehicles according to an exemplary embodiment of the present invention may have an M shape. The cross-section of the fiber 10 for a sound-absorbing material for vehicles may have an M shape. The fiber 10 for a sound-absorbing material may include an intermediate portion 300, the width a of which may be about 3 to 15 μm. When the width a of the intermediate portion 300 is less than about 3 μm, the shape retention of the fiber 10 for a sound-absorbing material may be reduced, and thus pores between base fibers, between a base fiber and a binder fiber, and between binder fibers, which constitute the sound-absorbing material, may be reduced in size, making it difficult to maintain the pores. When the width a of the intermediate portion 300 is greater than about 15 μm, even if the ratio of length L to width a (L/a) of the intermediate portion 300 may be increased to about 5 or greater, pores between the fibers, which constitute the sound-absorbing material, may be reduced in size, and the surface area increase effect may be decreased due to the relatively excessive increase in the size of the fiber 10 for a sound-absorbing material, resulting in deterioration of sound absorption efficiency.

The ratio of length L to width a (L/a) of the intermediate portion 300 may be about 5 to 25. The length L of the intermediate portion 300, which includes a first intermediate portion 310, a second intermediate portion 320, a third intermediate portion 330, and a fourth intermediate portion 340, may be the distance from one end of the first intermediate portion 310 (one of two opposite ends of the first intermediate portion 310 that is spaced apart from the second intermediate portion 320) to one end of the fourth intermediate portion 340 (one of two opposite ends of the fourth intermediate portion 340 that is spaced apart from the third intermediate portion 330) when the first intermediate portion 310, the second intermediate portion 320, the third intermediate portion 330, and the fourth intermediate portion 340 are straightened.

When the ratio of length L to width a (L/a) of the intermediate portion 300 is less than about 5, the value of L may be relatively low, and thus it may be impossible to realize a normal cross-sectional shape. When the ratio of length L to width a (L/a) of the intermediate portion 300 is greater than about 25, the resistance of a spinning nozzle (a mold) during the spinning of the fiber 10 for a sound-absorbing material may increase, and thus the cross-section of the fiber 10 for a sound-absorbing material may not be formed normally. Accordingly, the sound absorption performance may be reduced, and the physical properties of the fiber 10 for a sound-absorbing material may be changed.

The cross-section of the fiber 10 for a sound-absorbing material for vehicles according to an exemplary embodiment of the present invention includes a first end portion 100, a second end portion 200, and an intermediate portion 300.

The first end portion 100 is connected to the intermediate portion 300. The first end portion 100 is spaced apart from the second end portion 200. The first end portion 100 has a width A1 larger than the width a of the intermediate portion 300. Since the width A1 of the first end portion 100 is greater than the width a of the intermediate portion 300, it is possible to prevent a reduction in the porosity attributable to overlapping between the base fibers, between the base fiber and the binder fiber, and between the binder fibers when forming the sound-absorbing material.

The ratio of the width A1 of the first end portion 100 to the width a of the intermediate portion 300 (A1/a) may be about 1.1 to 3.0. When the ratio of the width A1 of the first end portion 100 to the width a of the intermediate portion 300 (A1/a) is less than about 1.1, the pores between the base fibers, between the base fiber and the binder fiber, and between the binder fibers, which are included in the sound-absorbing material, may be reduced in size, and thus the sound absorption efficiency improvement effect may be decreased. When the ratio of the width A1 of the first end portion 100 to the width a of the intermediate portion 300 (A1/a) is greater than about 3.0, it is difficult to realize the normal cross-sectional shape of the fiber 10 for a sound-absorbing material during the melt-spinning process of the first end portion 100 and the second end portion 200. Accordingly, the sound absorption performance may be reduced, and the physical properties of the fiber 10 for a sound-absorbing material may be changed.

The intermediate portion 300 is connected to the first end portion 100 and the second end portion 200. The intermediate portion 300 has at least three bent portions. The intermediate portion 300 may have an M shape.

As described above, the intermediate portion 300 includes the first intermediate portion 310, the second intermediate portion 320, the third intermediate portion 330, and the fourth intermediate portion 340. The first intermediate portion 310 is connected to the first end portion 100. The second intermediate portion 320 is connected to the first intermediate portion 310 and the third intermediate portion 330. The third intermediate portion 330 is connected to the second intermediate portion 320 and the fourth intermediate portion 340. The fourth intermediate portion 340 is connected to the third intermediate portion 330 and the second end portion 200. The first intermediate portion 310 and the second intermediate portion 320 form a first bent portion C1. The second intermediate portion 320 and the third intermediate portion 330 form a second bent portion C2. The third intermediate portion 330 and the fourth intermediate portion 340 form a third bent portion C3.

The second end portion 200 is spaced apart from the first end portion 100. The second end portion 200 is connected to the intermediate portion 300. The second end portion 200 has a width A2 larger than the width a of the intermediate portion 300, and thus it is possible to prevent a reduction in the porosity attributable to overlapping between the base fibers, between the base fiber and the binder fiber, and between the binder fibers, which constitute the sound-absorbing material.

The ratio of the width A2 of the second end portion 200 to the width a of the intermediate portion 300 (A2/a) may be about 1.1 to 3.0. When the ratio of the width A2 of the second end portion 200 to the width a of the intermediate portion 300 (A2/a) is less than about 1.1, the pores between the base fibers, between the base fiber and the binder fiber, and between the binder fibers, which constitute the sound-absorbing material, may be reduced in size, and thus the sound absorption efficiency improvement effect may be decreased. When the ratio of the width A2 of the second end portion 200 to the width a of the intermediate portion 300 (A2/a) is greater than about 3.0, it is difficult to realize the normal cross-sectional shape of the fiber 10 for a sound-absorbing material during the melt-spinning process of the first end portion 100 and the second end portion 200. Accordingly, the sound absorption performance may be lowered, and the physical properties of the fiber 10 for a sound-absorbing material may be changed.

The sound-absorbing material for vehicles according to an exemplary embodiment of the present invention includes the fiber 10 for a sound-absorbing material. The fiber 10 for a sound-absorbing material may be a base fiber. The sound-absorbing material according to the embodiment of the present invention includes a base fiber and a binder fiber. The sound-absorbing material may include an amount of about 60 to 80 parts by weight of a base fiber and an amount of about 20 to 40 parts by weight of a binder fiber based on the total weight of the sound-absorbing material. When the base fiber is used in an amount less than about 60 parts by weight, the porosity may be lowered, and thus the sound absorption performance may be deteriorated. When the base fiber is used in an amount greater than about 80 parts by weight, the amount of the binder fiber may be small, and thus durability and shape retention may be deteriorated. When the binder fiber is used in an amount less than about 20 parts by weight, the amount of the binder fiber may be small, and thus the durability and shape retention of the sound-absorbing material may be deteriorated. When the binder fiber is used in an amount greater than about 40 parts by weight, the amount of the base fiber may be small, and thus sound absorption performance may be deteriorated.

The base fiber provides pores in the sound-absorbing material to provide a sound absorption function. The base fiber may suitably include one or more selected from the group consisting of poly(ethylene terephthalate) (PET), polypropylene (PP), and poly(butylene terephthalate) (PBT).

The binder fiber may be combined with the base fiber to improve the durability of the sound-absorbing material. The melting point of the entirety or the surface of the binder fiber may be less than the melting point of the base fiber. The binder fiber may include, for example, at least one of a polyester-based polymer or a polyolefin-based polymer. The polyolefin-based polymer may be, for example, a polyethylene polymer, a polypropylene polymer, a modified polyethylene polymer, or a modified polypropylene polymer.

The cross-section of the binder fiber may be the same as the cross-section of the fiber for a sound-absorbing material. For example, the cross-section of the binder fiber may have an M shape, in which the width of the end portion is larger than the width of the intermediate portion, as shown in FIG. 1. The cross-section of the binder fiber may be different from the cross-section of the fiber for a sound-absorbing material. For example, the cross-section of the binder fiber may be a circular, elliptical, or n-gonal (where n is a natural number of 3 or more) shape.

The fiber for a sound-absorbing material for vehicles and the sound-absorbing material for vehicles including the same according to an exemplary of embodiment of the present invention include the first end portion and the second end portion, which have a width larger than the width of the intermediate portion, and at least three bent portions, thereby maximizing the size of pores between the base fibers included in the fiber for a sound-absorbing material and maximizing the binding force between the base fiber and the binder fiber, which constitute the sound-absorbing material. As a result, durability and sound absorption performance may be improved together.

EXAMPLE

Hereinafter, the present invention will be described in more detail with reference to concrete examples. However, the following examples are only proposed for illustrative purposes, and the scope of the present invention is not limited to these examples.

Example 1

A non-woven fabric sound-absorbing material, having a weight of 1000 g/cm$^2$ and a thickness of 5 mm, was manufactured using 70 parts by weight of a base fiber made from polyester and 30 parts by weight of a binder fiber made from low-melting-point polyester, the melting point of the surface of which was lower than the melting point of the base fiber.

A fiber for a sound-absorbing material, which has the cross-sectional shape shown in FIGS. 3A to 3D, was used as the base fiber. Each of the ratio of the width of the first end portion to the width of the intermediate portion and the ratio of the width of the second end portion to the width of the intermediate portion was 1.5. The ratio of length to width of the intermediate portion was 15. A fiber having a circular cross-section was used as the binder fiber.

Example 2

A non-woven fabric was manufactured in the same manner as in Example 1, except that each of the ratio of the width of the first end portion to the width of the intermediate portion and the ratio of the width of the second end portion to the width of the intermediate portion was 2.5 and the ratio of length to width of the intermediate portion was 10 in terms of the cross-section of the fiber for a sound-absorbing material.

Example 3

A non-woven fabric was manufactured in the same manner as in Example 2, except that a base fiber was used in an amount of 80 parts by weight and a binder fiber was used in an amount of 20 parts by weight.

Example 4

A non-woven fabric was manufactured in the same manner as in Example 3, except that a base fiber was used in an amount of 60 parts by weight and a binder fiber was used in an amount of 40 parts by weight.

Comparative Example 1

Figure 4A:
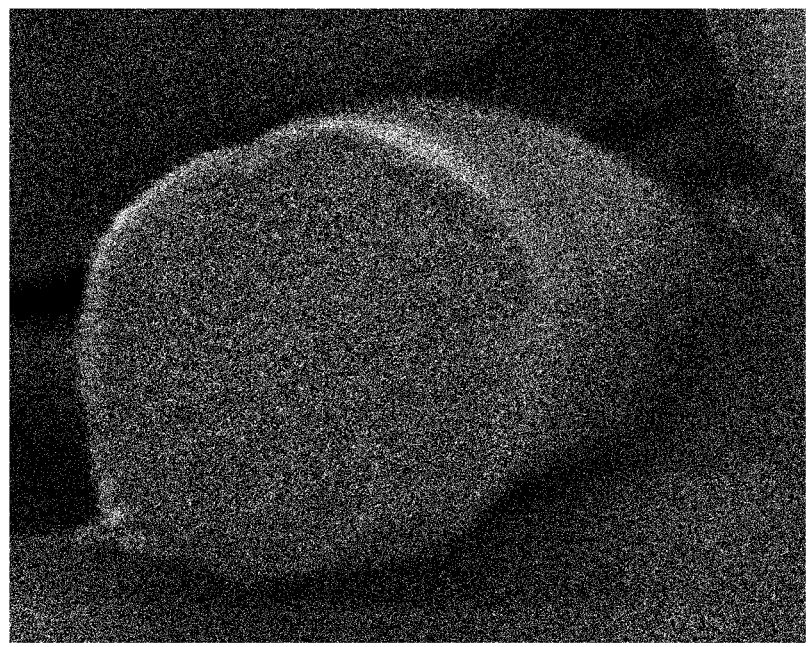
FIG. 4A shows a picture of a fiber of Comparative Example 1.

A fiber, having the circular cross-section shown in FIG. 4A, was manufactured from polyester. A non-woven fabric having a weight of 1000 g/cm$^2$ and a thickness of 5 mm was manufactured using the above fiber.

Comparative Example 2

Figure 4B:
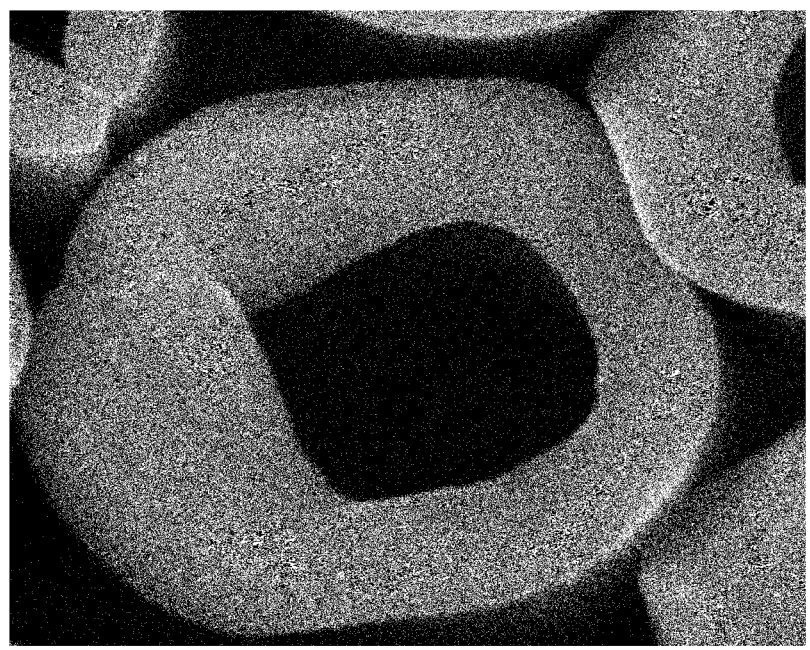
FIG. 4B shows a picture of a fiber of Comparative Example 2.

A fiber, having the hollow cross-section shown in FIG. 4B, was manufactured from polyester. A non-woven fabric having a weight of 1000 g/cm² and a thickness of 5 mm was manufactured using the above fiber.

Comparative Example 3

Figure 4C:
FIG. 4C shows a picture of a fiber of Comparative Example 3.

A fiber, having the eight-leaf-shaped cross-section shown in FIG. 4C, was manufactured from polyester. A non-woven fabric having a weight of 1000 g/cm² and a thickness of 5 mm was manufactured using the above fiber.

Comparative Example 4

A non-woven fabric sound-absorbing material, having a weight of 1000 g/cm² and a thickness of 5 mm, was manufactured using 70 parts by weight of a base fiber made from polyester and 30 parts by weight of a binder fiber made from low-melting-point polyester, the melting point of the surface of which was lower than the melting point of the base fiber.

Figure 5A:
FIG. 5A shows a picture of a fiber of Comparative Example 4.

A fiber, having a cross-section in which the ratio of the width of the end portion to the width of the intermediate portion was 1.05, as shown in FIG. 5A, was used as the base fiber. A fiber having a circular cross-section was used as the binder fiber.

Comparative Example 5

Figure 5B:
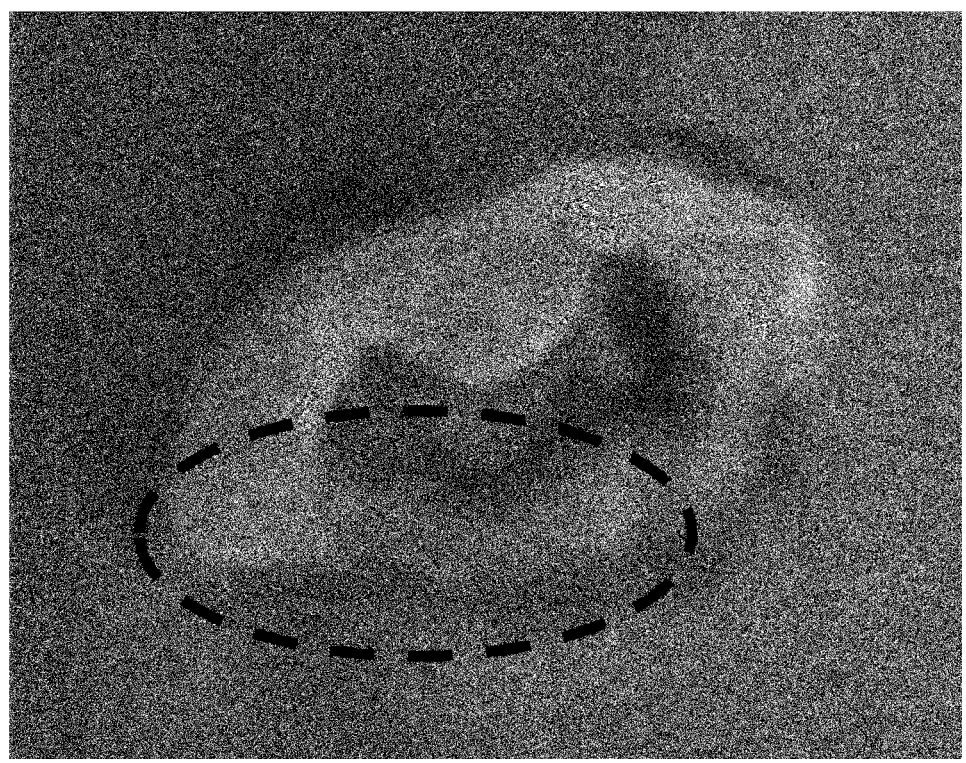
FIG. 5B shows a picture of a fiber of Comparative Example 5.

A fiber, having a cross-section in which the ratio of the width of the end portion to the width of the intermediate portion was 3.50, as shown in FIG. 5B, was manufactured from polyester. A non-woven fabric having a weight of 1000 g/cm² and a thickness of 5 mm was manufactured using the above fiber.

Comparative Example 6

Figure 6A:
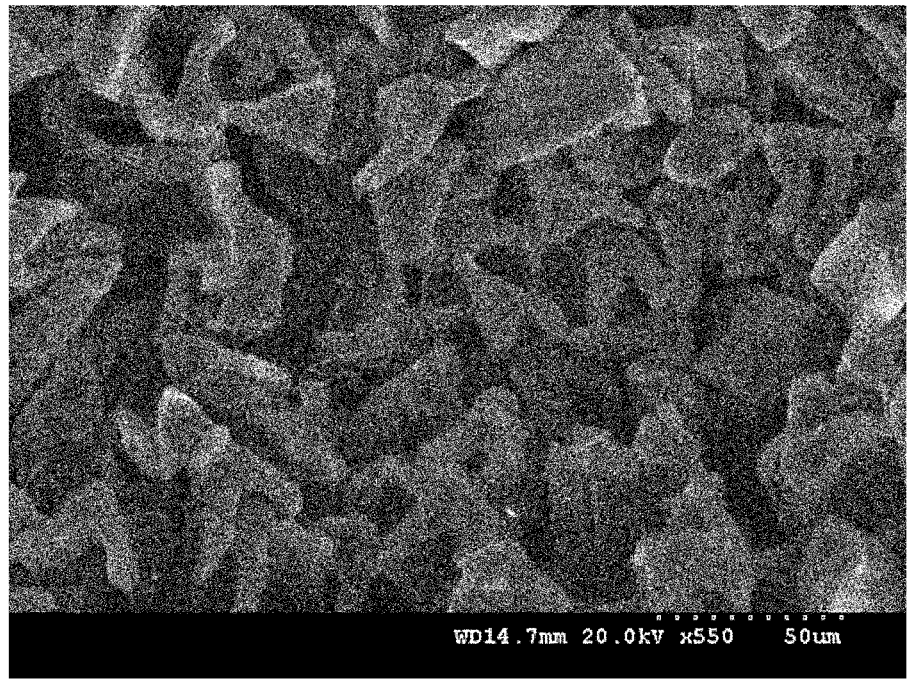
FIG. 6A shows a picture of a fiber of Comparative Example 6.

A fiber, having a cross-section in which the ratio of length to width of the intermediate portion was 3, as shown in FIG. 6A, was manufactured from polyester. A non-woven fabric having a weight of 1000 g/cm² and a thickness of 5 mm was manufactured using the above fiber.

Comparative Example 7

Figure 6B:
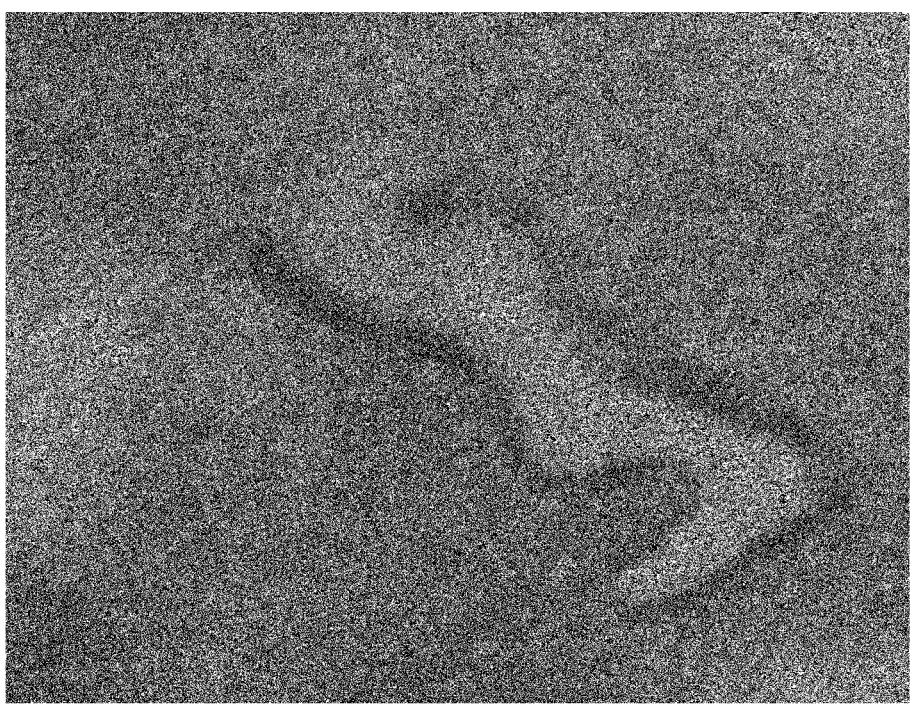
FIG. 6B shows a picture of a fiber of Comparative Example 7.

A fiber, having a cross-section in which the ratio of length to width of the intermediate portion was 30, as shown in FIG. 6B, was manufactured from polyester. A non-woven fabric having a weight of 1000 g/cm² and a thickness of 5 mm was manufactured using the above fiber.

Comparative Example 8

Figure 7:
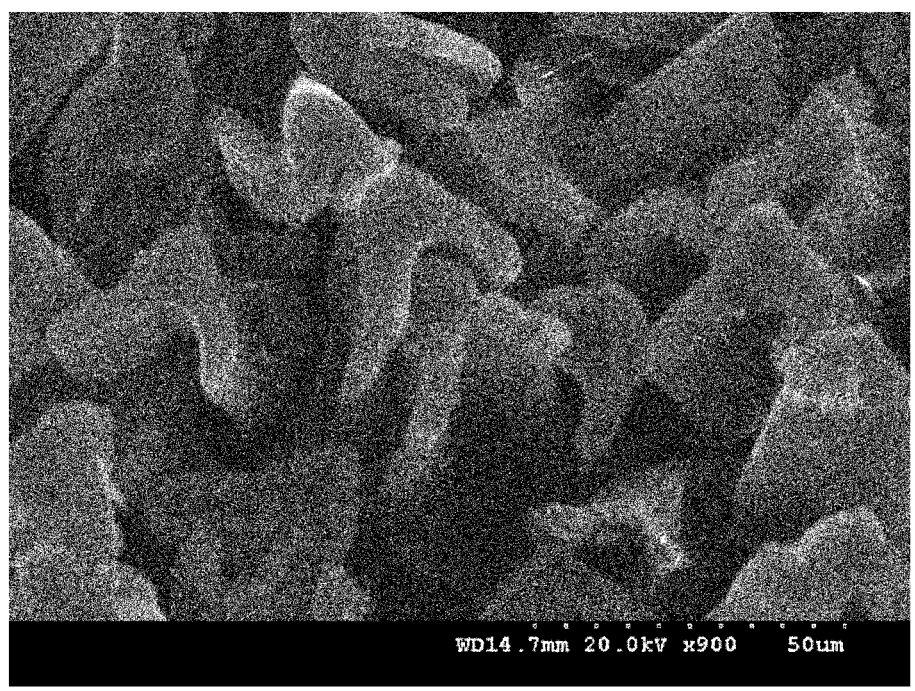
FIG. 7 shows a picture of a fiber of Comparative Example 8.

A fiber, having a cross-section in which the ratio of length to width of the intermediate portion was 4 and having a V shape having only one bent portion, as shown in FIG. 7, was manufactured from polyester. A non-woven fabric having a weight of 1000 g/cm² and a thickness of 5 mm was manufactured using the above fiber.

Comparative Example 9

A non-woven fabric, having a weight of 1000 g/cm² and a thickness of 5 mm, was manufactured using 80 parts by weight of a base fiber made from polyester and 20 parts by weight of a binder fiber made from low-melting-point polyester, the melting point of the surface of which was lower than the melting point of the base fiber. A fiber having a circular cross-section was used as the base fiber and the binder fiber.

Comparative Example 10

The same process as in Comparative Example 9 was conducted, except that 70 parts by weight of a base fiber made from polyester and 30 parts by weight of a binder fiber made from low-melting-point polyester, the melting point of the surface of which was less than the melting point of the base fiber, were used.

Comparative Example 11

The same process as in Comparative Example 9 was conducted, except that 60 parts by weight of a base fiber made from polyester and 40 parts by weight of a binder fiber made from low-melting-point polyester, the melting point of the surface of which was less than the melting point of the base fiber, were used.

Measurement of Physical Properties

Figure 8A:
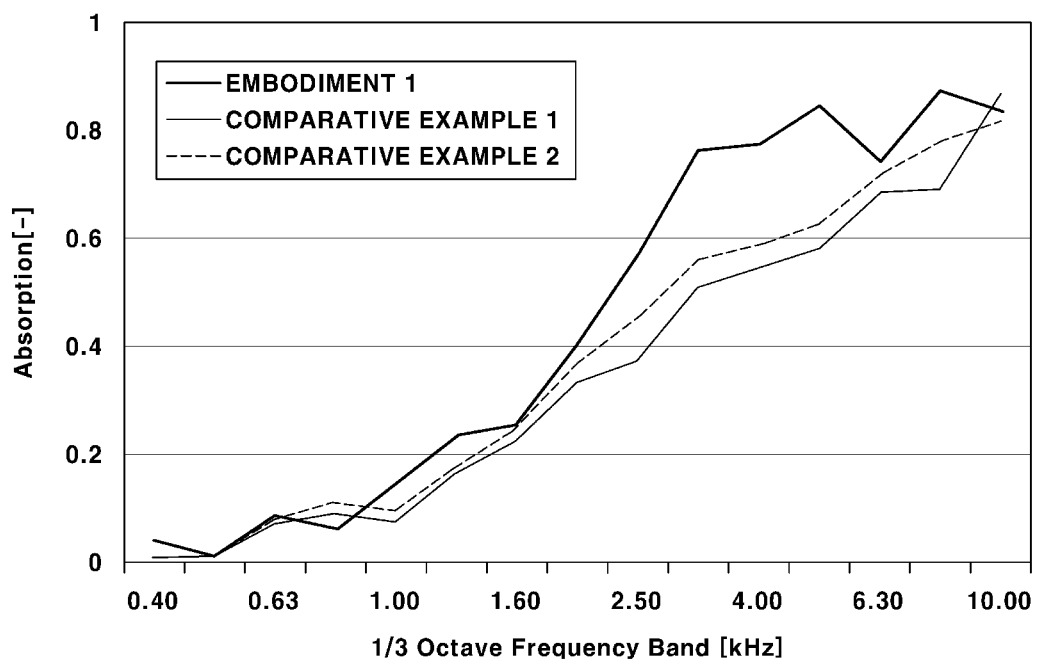
FIG. 8A shows a graph showing measurement of the sound absorption performance of Example 1 according to an exemplary embodiment of the present invention, Comparative Example 1 and Comparative Example 2.

1. FIG. 8A is a graph showing measurement of the sound absorption performance of Example 1, Comparative Example 1, and Comparative Example 2. As shown in FIG. 8A, the fiber of Example 1 had a larger pore volume between fibers than the fibers of Comparative Example 1 and Comparative Example 2 and thus had excellent sound absorption performance.

Figure 8B:
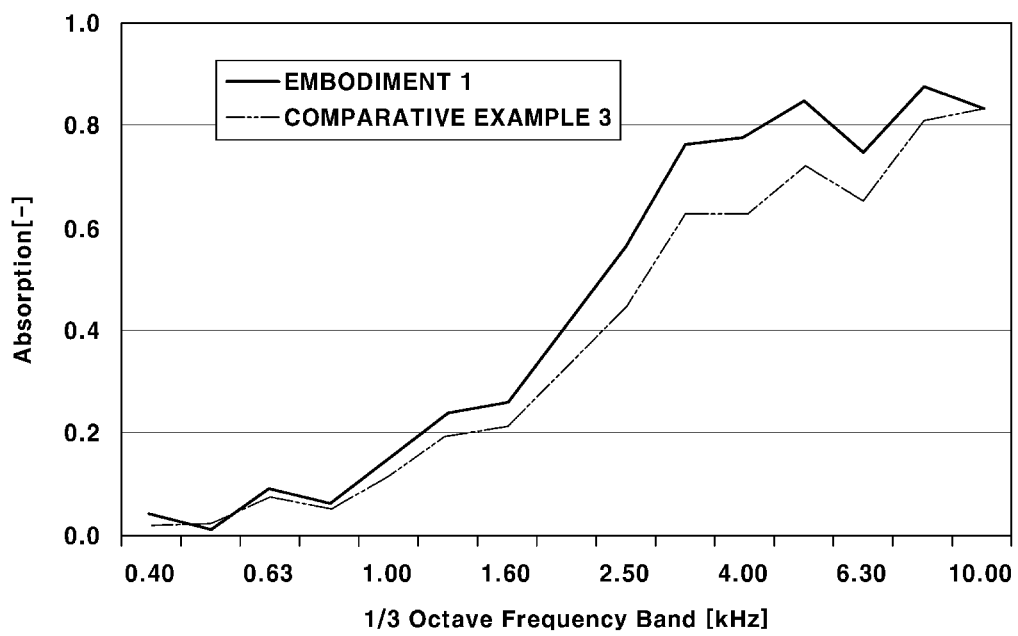
FIG. 8B shows a graph showing measurement of the sound absorption performance of Example 1 according to an exemplary embodiment of the present invention and Comparative Example 3.
Figure 8C:
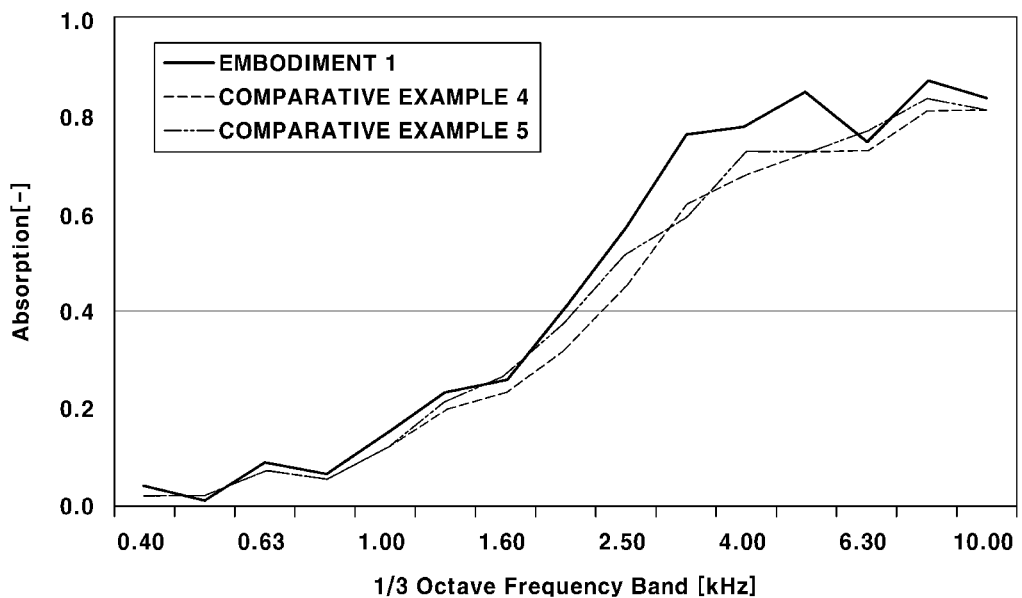
FIG. 8C shows a graph showing measurement of the sound absorption performance of Example 1 according to an exemplary embodiment of the present invention, Comparative Example 4 and Comparative Example 5.

2. FIG. 8B is a graph showing measurement of the sound absorption performance of Example 1 and Comparative Example 3. As shown in FIG. 8B, the fiber of Example 1 had less heterogeneity but had a larger pore volume between fibers than the fiber of Comparative Example 3, and thus had excellent sound absorption performance 3. FIG. 8C is a graph showing measurement of the sound absorption performance of Example 1, Comparative Example 4, and Comparative Example 5. As shown in FIG. 8C, Comparative Example 4 had poor sound absorption performance due to a reduction in the pore volume between fibers attributable to overlapping of fibers and that Comparative Example 5 had low mass productivity and poor sound absorption performance due to thermal bonding between fibers during spinning thereof.

Figure 8D:
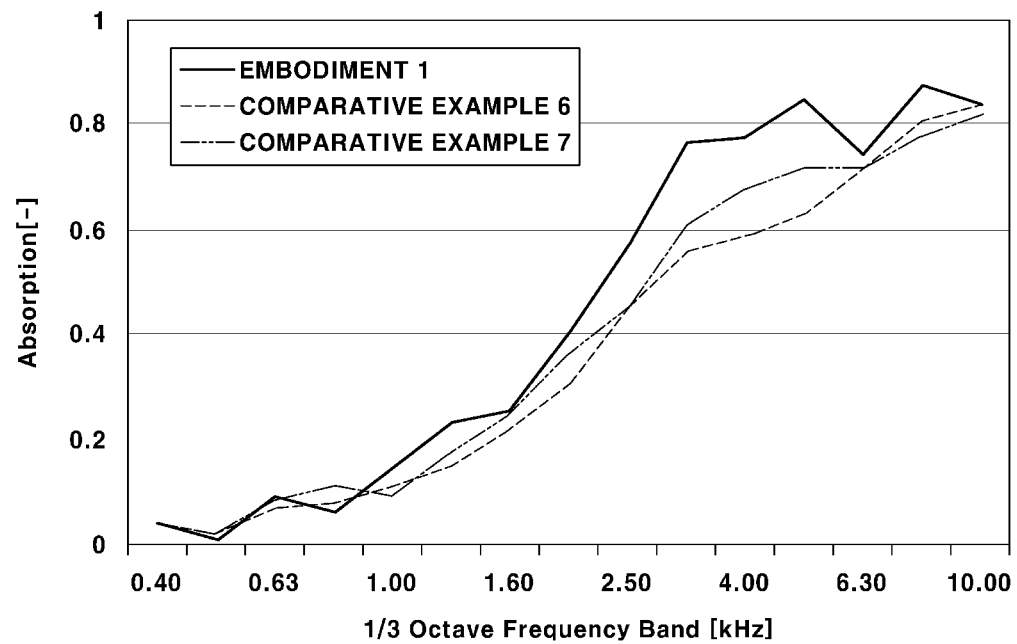
FIG. 8D shows a graph showing measurement of the sound absorption performance of Example 1 according to an exemplary embodiment of the present invention, Comparative Example 6 and Comparative Example 7.

4. FIG. 8D is a graph showing measurement of the sound absorption performance of Example 1, Comparative Example 6, and Comparative Example 7. As shown in FIG. 8D, Example 1 had greater sound absorption performance than Comparative Example 6, the fiber of which had a cross-section in which the ratio of length to width of an intermediate portion is relatively small, and Comparative Example 7, the fiber of which had a cross-section in which the ratio of length to width of an intermediate portion was relatively large.

Figure 8E:
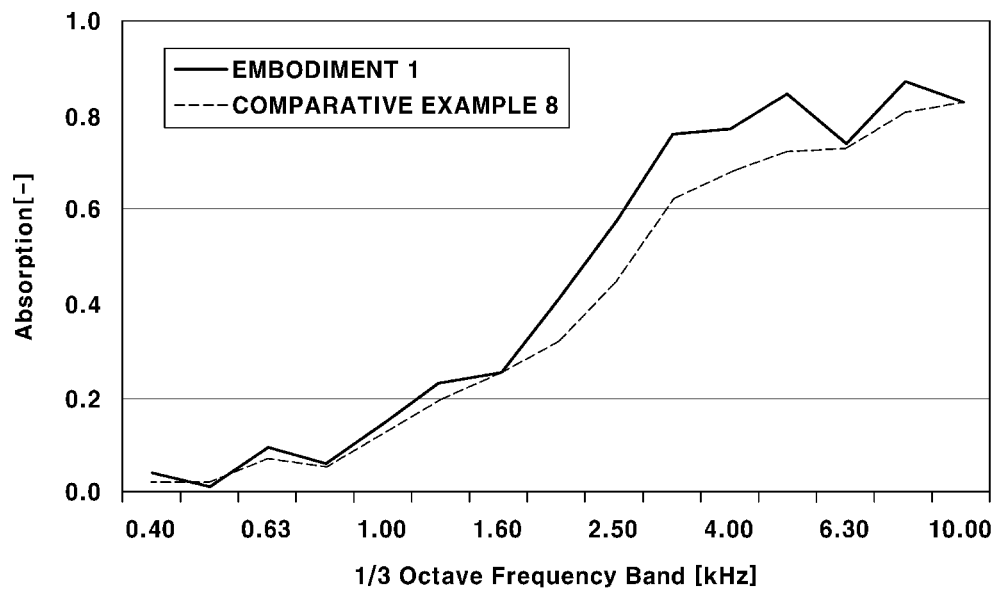
FIG. 8E shows a graph showing measurement of the sound absorption performance of Example 1 according to an exemplary embodiment of the present invention and Comparative Example 8.

5. FIG. 8E is a graph showing measurement of the sound absorption performance of Example 1 and Comparative Example 8. As shown in FIG. 8E, Comparative Example 8 had poor sound absorption performance due to a reduction in the pore volume between fibers.

Figure 8F:
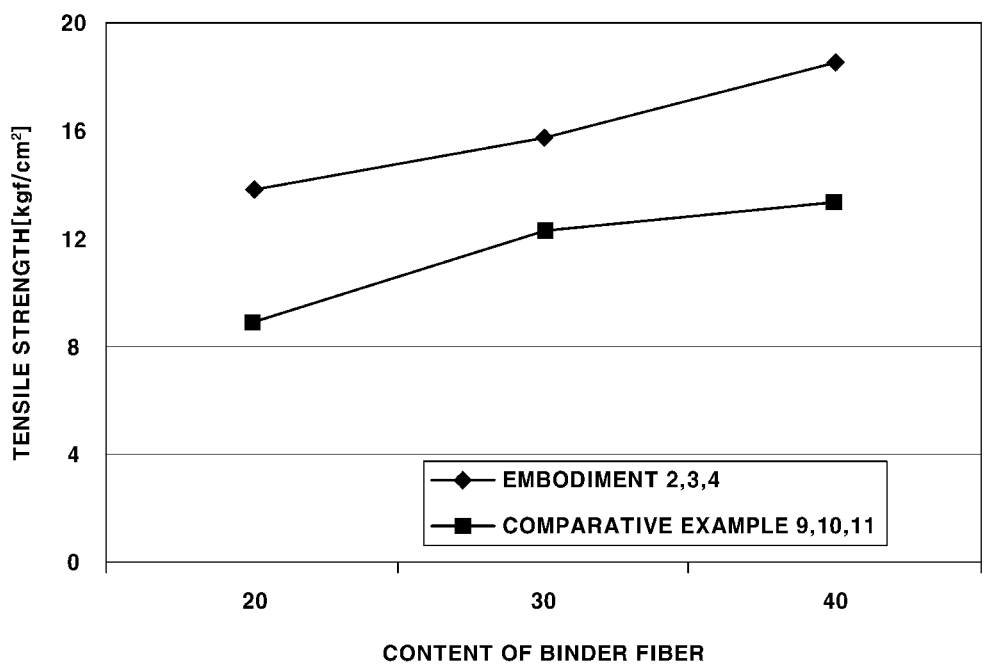
FIG. 8F shows a graph showing measurement of the tensile strength of Examples 2 to 4 according to exemplary embodiments of the present invention and Comparative Examples 9 to 11.

6. FIG. 8F is a graph showing measurement of the tensile strength of Examples 2 to 4 and Comparative Examples 9 to 11. The tensile strength was measured under conditions in which ASTM D638 Type 1 was used as a specimen for tensile tests and the tensile speed was 200 mm/min. The measured values of tensile strength are shown in Table 1 below.

TABLE 1

| Classification | Tensile Strength |
| --- | --- |
| Example 2 | 15.7 kgf/cm$^2$ |
| Example 3 | 13.8 kgf/cm$^2$ |
| Example 4 | 18.5 kgf/cm$^2$ |
| Comparative Example 9 | 8.9 kgf/cm$^2$ |
| Comparative Example 10 | 12.3 kgf/cm$^2$ |
| Comparative Example 11 | 13.3 kgf/cm$^2$ |

As shown in FIG. 8F and Table 1, in comparison with Comparative Examples 9 to 11, Examples 2 to 4 are characterized in that an available area for contact with a binder fiber was increased, the binding force between fibers was therefore increased in the manufacture of a non-woven fabric, and the non-woven fabric had relatively superior physical properties.

Figure 9:
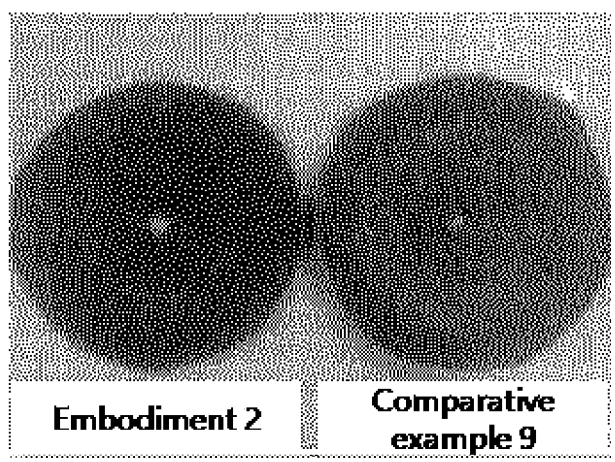
FIG. 9 shows a picture showing measurement of wear resistance of Example 2 according to an exemplary embodiment of the present invention and Comparative Example 9.

7. FIG. 9 is a picture showing measurement of wear resistance of Example 2 and Comparative Example 9. The wear resistance was measured through a Taber wear test, which was performed under conditions in which an H-18 abrasive wheel was used, a wear speed was 70 times/min, and a load was 1000 g. The evaluation criteria are shown in Table 2 below. The wear resistance of Example 2 was measured as grade 4, and the wear resistance of Comparative Example 9 was measured as grade 3. As such, Example 2 had greater wear resistance than Comparative Example 9.

TABLE 2

| Grade | Evaluation Criteria |
| --- | --- |
| 5 | No Wear Observed |
| 4 | Slight Cut in Pile |
| 3 | Cut and Wear in Pile, but Unapparent |
| 2 | Cut, Breakage, and Wear Clearly Observed in Pile |
| 1 | Severe Cut and Wear in Pile, Deep Crack in Worn Surface |

Accordingly, an exemplary fiber for an exemplary sound-absorbing material for vehicles according to an exemplary embodiment of the present invention may have improved durability and sound absorption performance.

In addition, a sound-absorbing material for vehicles according to an exemplary embodiment of the present invention has improved durability and sound absorption performance.

The invention has been described in detail with reference to various exemplary embodiments thereof. However, it will be appreciated by those skilled in the art that changes may be made in these embodiments without departing from the principles and spirit of the invention, the scope of which is defined in the appended claims and their equivalents.

What is claimed is:

1. A fiber for a sound-absorbing material for vehicles, the fiber comprising a predetermined cross-section,
wherein the cross-section of the fiber comprises:
a first end portion;
a second end portion spaced apart from the first end portion; and
an intermediate portion connected to the first end portion and the second end portion,
wherein the intermediate portion comprises at least three bent portions, and
wherein each of the first end portion and the second end portion has a width larger than a width of the intermediate portion,
wherein the fiber is manufactured by melt spinning in a spinning nozzle,
wherein the shape of the spinning nozzle is the shape of the cross-section of the fiber,
wherein a ratio of a width (A1) of the first end portion to a width (a) of the intermediate portion (A1/a) is about 1.1 to 3.0, and
wherein a ratio of a width (A2) of the second end portion to the width (a) of the intermediate portion (A2/a) is about 1.1 to 3.0,
wherein the width (a) of the intermediate portion is about 3 to 15 um,
wherein a ratio of a length (L) of the intermediate portion to the width (a) of the intermediate portion is about 5 to 25.

2. The fiber of claim 1, wherein the cross-section of the fiber has an M shape.

3. The fiber of claim 1, wherein the intermediate portion has an M shape.

4. The fiber of claim 1, wherein the intermediate portion comprises:
a first intermediate portion connected to the first end portion;
a second intermediate portion connected to the first intermediate portion;
a third intermediate portion connected to the second intermediate portion; and
a fourth intermediate portion connected to the third intermediate portion and the second end portion,
wherein the first intermediate portion and the second intermediate portion form a first bent portion,
wherein the second intermediate portion and the third intermediate portion form a second bent portion, and
wherein the third intermediate portion and the fourth intermediate portion form a third bent portion.

5. A sound-absorbing material for vehicles comprising the fiber for a sound-absorbing material for vehicles of claim 1.

6. The sound-absorbing material of claim 5, wherein the fiber for a sound-absorbing material is a base fiber, and
wherein the sound-absorbing material comprises an amount of about 60 to 80 parts by weight of the base fiber and an amount of about 20 to 40 parts by weight of a binder fiber based on a total weight of the sound-absorbing material.

7. The sound-absorbing material of claim 6, wherein the base fiber comprises one or more selected from the group consisting of poly(ethylene terephthalate) (PET), polypropylene (PP), and poly(butylene terephthalate) (PBT).

8. The sound-absorbing material of claim 6, wherein a melting point of an entirety or a surface of the binder fiber is lower than a melting point of the base fiber, and
wherein the binder fiber comprises at least one from a polyester-based polymer or a polyolefin-based polymer.

9. The sound-absorbing material of claim 6, wherein a cross-section of the binder fiber is same as a cross-section of the fiber for a sound-absorbing material, or has a circular or elliptical shape.

10. A vehicle comprising a sound-absorbing material of claim 1.

11. A vehicle comprising a sound-absorbing material of claim 6.

* * * * *